United States Patent [19]

Scharer et al.

[11] 4,310,251

[45] Jan. 12, 1982

[54] CONTINUOUS MIXER INTERNAL PRESSURE CONTROL

[75] Inventors: Hans R. Scharer, Wallingford; Dominic A. D'Amato, Cheshire; Peter Hold, Milford; Manfred Hubner, New Haven, all of Conn.

[73] Assignee: Intercole Automation, Inc., Cleveland, Ohio

[21] Appl. No.: 739,354

[22] Filed: Nov. 5, 1976

Related U.S. Application Data

[63] Continuation of Ser. No. 584,334, Jun. 6, 1975, abandoned, which is a continuation of Ser. No. 338,534, Mar. 6, 1973, abandoned, which is a continuation of Ser. No. 91,351, Nov. 30, 1970, abandoned.

[51] Int. Cl.³ .............................................. B29B 1/10
[52] U.S. Cl. ...................................... 366/77; 366/83; 366/85; 425/208

[58] Field of Search .................. 259/191, 192, 193, 6, 259/7, 9, 10, 41, 42; 425/205, 207, 208; 366/77, 79, 83, 69, 91

[56] References Cited

U.S. PATENT DOCUMENTS

| 2,683,895 | 7/1954 | Scofield | 425/205 |
| 3,154,808 | 11/1964 | Ahlefeld | 259/192 |
| 3,700,374 | 10/1972 | Matsuoka | 259/192 |

Primary Examiner—Robert W. Jenkins
Attorney, Agent, or Firm—Watts, Hoffmann, Fisher & Heinke Co.

[57] ABSTRACT

The disclosure concerns a continuous mixer for plastic material and of the type which permits control of the pressure on the material being mixed in the mixer by resisting the flow of mixed material displaced from the mixer when unmixed material is fed into the mixer. The resistance to the discharged flow is effected by one or more elements which engage the flow and which are movable.

3 Claims, 12 Drawing Figures

CONTINUOUS MIXER INTERNAL PRESSURE CONTROL

RELATED APPLICATIONS

This application is a continuation of Ser. No. 584,334, filed June 6, 1975, abandoned; which is a continuation of Ser. No. 338,534, filed Mar. 6, 1973, abandoned; which is a continuation of Ser. No. 91,351, filed Nov. 30, 1970, now abandoned.

Continuous mixers of the type disclosed by the Ahlefeld Jr. et al U.S. Pat. No. 3,154,808 dated Nov. 3, 1964 include a mixing enclosure having interspaced entrance and exit openings and containing mixing means. The mixing time of the material in the enclosure is dependent on the rate at which material in the enclosure is moved out through the exit opening.

By varying the size of the exit opening, the pressure required to push the material through this opening and, therefore, the pressure on the material being mixed internally in the enclosure, may be controlled.

This restraint is sometimes unsatisfactory because of unevenness in the action obtained. Attempts to obtain smoother action by the use of walls having polished surfaces or lubricating surfaces has not been completely satisfactory.

A smoother action is obtainable where the restraint to the flow of material discharged from the continuous mixer is provided by one or more surfaces contacted by the material and which move in the direction of its flow at controllable speeds. Movement at a speed initially slower than that of the flow when unimpeded, restrains the flow and effects a back pressure on the flow. Then, by adjusting this speed so that the rate of feed into and from the mixer is substantially the same, this back pressure remains and is reflected back on the material being mixed in the mixer while moving through the mixer. Adjustment of the moving speed of the surface or surfaces adjusts the internal mixer pressure to give and maintain the pressure desired for the mixing operation involved. The speed can be made automatically responsive to the temperature of the mixing or discharged material, temperature being a function of the pressure on the material being mixed.

A screw type extruder may be used to provide such a moving surface, or a gear pump may possibly be used instead, providing the rotative speed of the extruder screw, or pump gears, can be controlled.

With the foregoing in mind, specific examples of the present invention are illustrated by the accompanying drawings in which.

Figures 1, 2, 4:
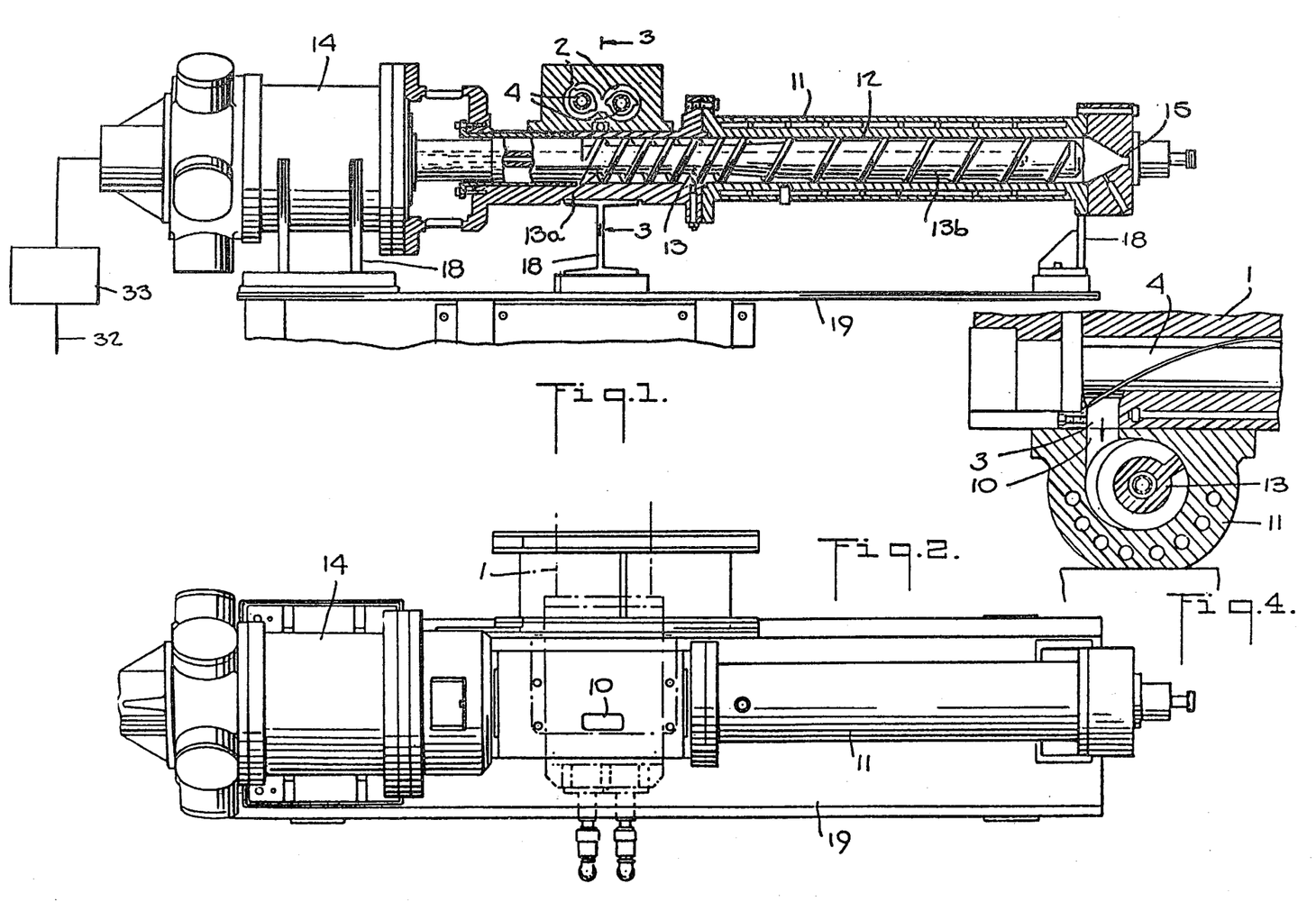
FIG. 1 is a side view of the extruder form in longitudinal section on a vertical plane with the exception of the motor which is shown in elevation.
FIG. 2 is a top view of FIG. 1.
FIG. 4 is like FIG. 3, but shows only the discharge portion of the mixer and the adjacent portion of the extruder and incorporates a modification.
Figure 3:
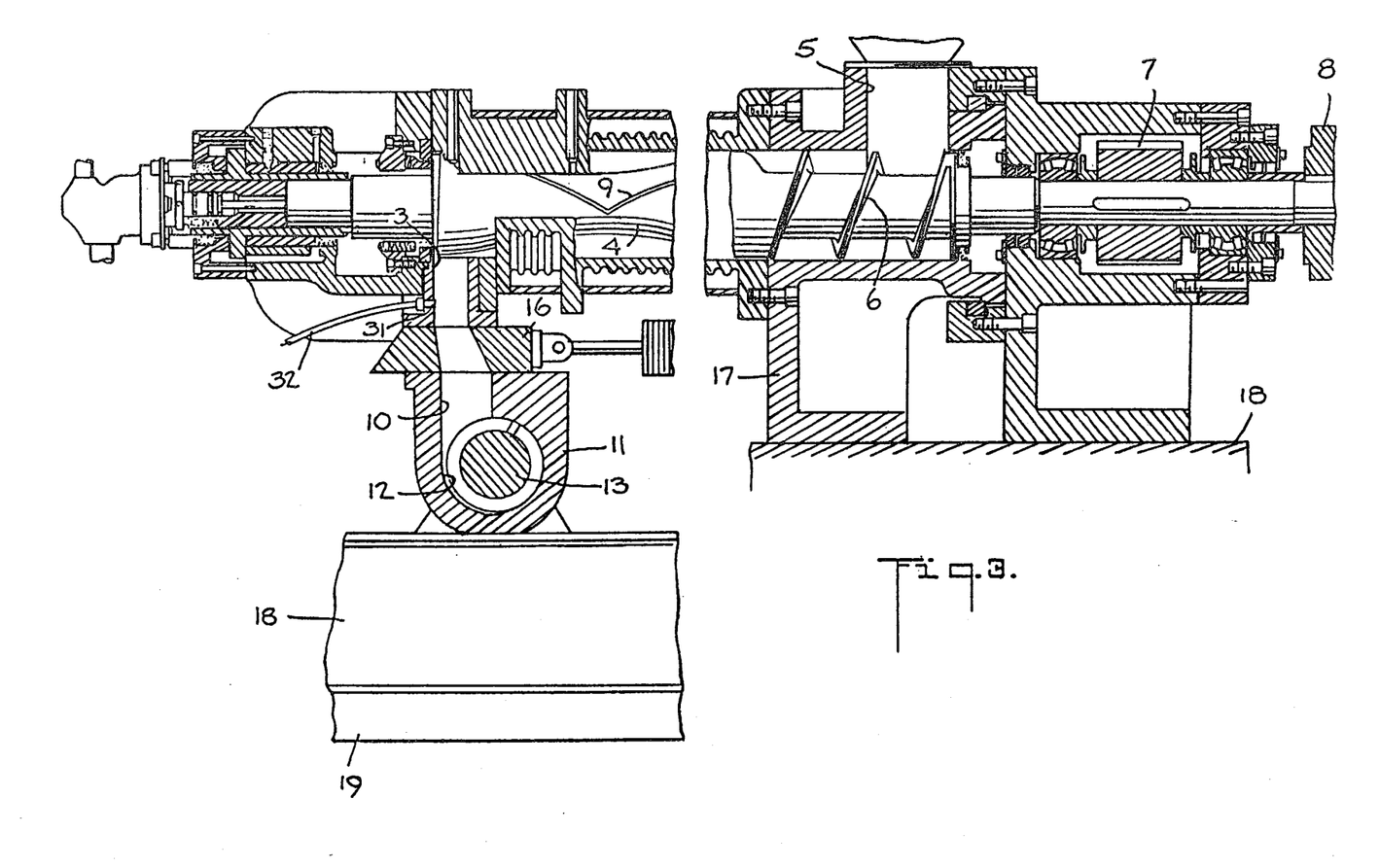
FIG. 3 is a cross section taken on the line 3—3 in FIG. 1.

Referring first to FIGS. 1 to 3, a continuous internal mixer, representative of one form of the type of continuous mixer referred to, is shown as comprising a barrel 1 which may have either of the forms shown by FIGS. 1 and 3. This barrel, in any event, forms two parallel, laterally interconnecting cylindrical material working or mixing chambers 2 having at one end a common discharge orifice 3. Bladed rotors 4 are located in the chambers 2. The material to be mixed is stuffed under pressure into the chambers 2 at an entrance location spaced from the discharge orifice 3. A vertical port 5 leads to stuffing or feed screw blades 6 formed on the rotors 4 and which push or feed the material in the direction of the discharge orifice 3 of the two cylinders 2V. The rotors 4 are intergeared for opposite rotation by gears 7 and supplied with a rotary drive system 8. Each of the rotors 4 has a blade 9 with a cross section which is substantially like that of a Banbury-type blade and having a portion that twists away from its direction of rotation and a portion that twists in the opposite direction, the length and twist ratio between these oppositely twisting portions of each blade being such that when the chambers 2 contain the material stuffed into them the average of the axially directed forces applied to the material by the blades is insufficient to force the material through the orifice 3. In this way the overall axial travel of the material through the chambers 2 is dependent on the rate at which it is received through the port 5. Each rotor may have more than one blade, each blade has the two portions referred to, and although not shown, these portions may be displaced relative to each other circumferentially with respect to the rotor.

The exit opening or discharge orifice 3 opens transversely from the chambers 2 and at least mainly in overlapping relation with respect to the portions of the blades 9 adjacent thereto. The blades may have other contours where they overlap the orifice 3, or separate elements (not shown) may be used to stuff the mixed material through the orifice 3. With opposite rotation of the rotors so that the blades of both turn downwardly in the direction of the orifice 3, there is a force exerted on the material by the blades, or other elements if used, to stuff it through this discharge orifice. This discharge of the material must be restrained in a controllable manner for the pressure on the material being mixed in the chambers 2 to be produced and controlled.

As shown by FIGS. 1 and 3 in particular, the discharge orifice 3 is connected directly and positively to the inlet 10 of a screw-type extruder having a barrel 11 forming a cylindrical material working or mixing chamber 12 in which a screw 13 is rotatively positioned. This screw is connected to a variable speed rotary motor 14 by means of which the rotative speed of this screw may be positively controlled. The chamber 12 has an outlet or extrusion orifice 15.

The motor 14 may be of the hydraulically operated type such as one of those commercially available from Houdaille Industries, Inc., Buffalo Hydraulics Division. However, any motor may be used providing adequate torque and which can be controlled as to its speed and which can drive the screw 13 at a selected constant rotary speed.

Adjacent to the extruder's inlet 10 and the mixer's discharge orifice 3 under operation the pressure in the extruder's chambers 12 is a back pressure, or in other words, a negative pressure with respect to the force on the material extruded through the outlet or extrusion orifice 15. Somewheres between that location and the orifice 15 the pressure on the material becomes positive with respect to the extruder's discharge orifice, or in other words, the screw will exert a forwardly direct force on the material.

As shown by FIG. 1, the screw 13 has its blades formed on a shaft having a portion 13a of relatively small diameter adjacent to the inlet end of the extruder, with the shaft then gradually enlarging to form a portion 13b of larger diameter throughout the balance of the screw 13. In this way the cross-sectional volume of the space between the screw's shaft and the inside of the chamber 13 is less adjacent to the outlet or extrusion orifice 15 than it is adjacent to the extruder's inlet 10. Therefore, the screw may exert a back pressure on the mixed material in the mixer's discharge orifice 3 and a higher positive or forward force on the material adjacent to the extruder's outlet or extrusion orifice 15.

When the continuous mixer is started up from its shutdown condition, it is preferably to close its discharge orifice 3 completely until the material charged has reached a plasticized condition and substantially stable operation is obtained. Therefore, as shown particularly by FIG. 3, a shutoff valve 16 of the sliding type is interposed between the discharge orifice 3 and the extruder's inlet 10. This valve can be closed when starting up the mixer and thereafter opened. When the mixer is in operation and the valve 16 is open the screw-type extruder provides the restraint to the discharge material.

As suggested by FIG. 4, the valve 16 may be eliminated. With the screw of the extruder held frictionally against rotation, the flow from the mixer's discharge orifice may be blocked because the spiral path to the discharge orifice 15 is too long to permit the mixer's discharge pressure to push the material through it. However, this is at the expense of unplasticized or partly plasticized material being driven more or less into the screw. Such material may be wasted by its subsequent extrusion from the extruder in either an unmixed or improperly mixed condition.

As shown by FIG. 3, the continuous mixer is rigidly supported by a base 17 resting on a solid foundation 18, with its barrel 1 and any parts connected to it projected from this base in cantilever fashion. In this FIG. 3 the screw-type extruder has its barrel 11 supported immovably by supports which are fastened to an immovable base member 19. The extruder is positioned transversely with respect to the mixer.

In FIGS. 5 to 9 the mixer and extruder are transversely related but the extruder has its barrel 11a and its motor 14a mounted by supports 18a which, in this instance, are supported by a carriage 20 having wheels 21 riding on tracks 22. The top of the barrel 11 has a flat surface 11b which slides along the bottom of the continuous mixer 1, and the flat top of the barrel 11a has a series of ports 23, spaced longitudinally along the barrel, which can be selectively registered with the discharge orifice 3 of the continuous mixer. A tight sliding fit is provided so that when any one of the ports 23 is registered with the orifice 3, there will be little or no leakage of mixed material discharged from the continuous mixer. The unused ports are closed by removable closure plates 24. The shank 13c of the extruder screw is, in this instance, of the same diameter throughout its length. The use of a screw having such a straight shank or one having the enlarged shank as shown by FIG. 1, depends on the amount of extrusion effect desired at the extrusion orifice, the effect being greater in the case of the orifice 15 of FIG. 1 than it is in the case of orifice 15a shown in FIGS. 5 and 7.

Figure 5:
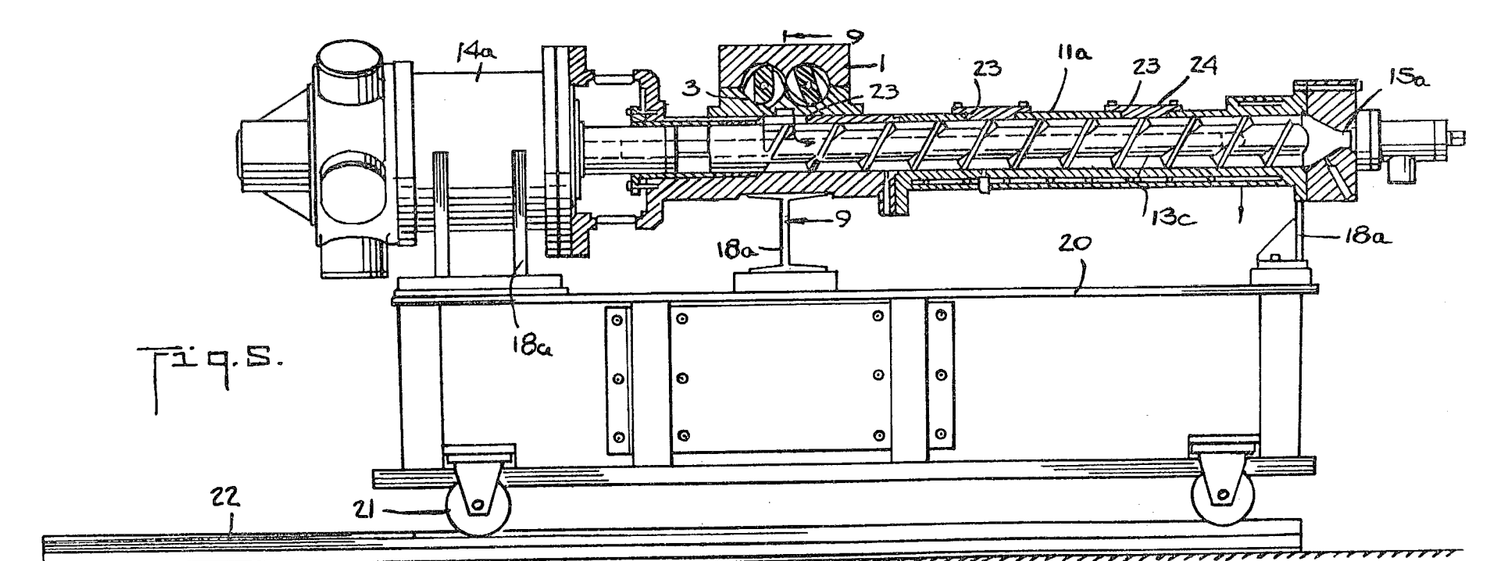
FIG. 5 corresponds to FIG. 1, but shows a modification.
Figure 6:
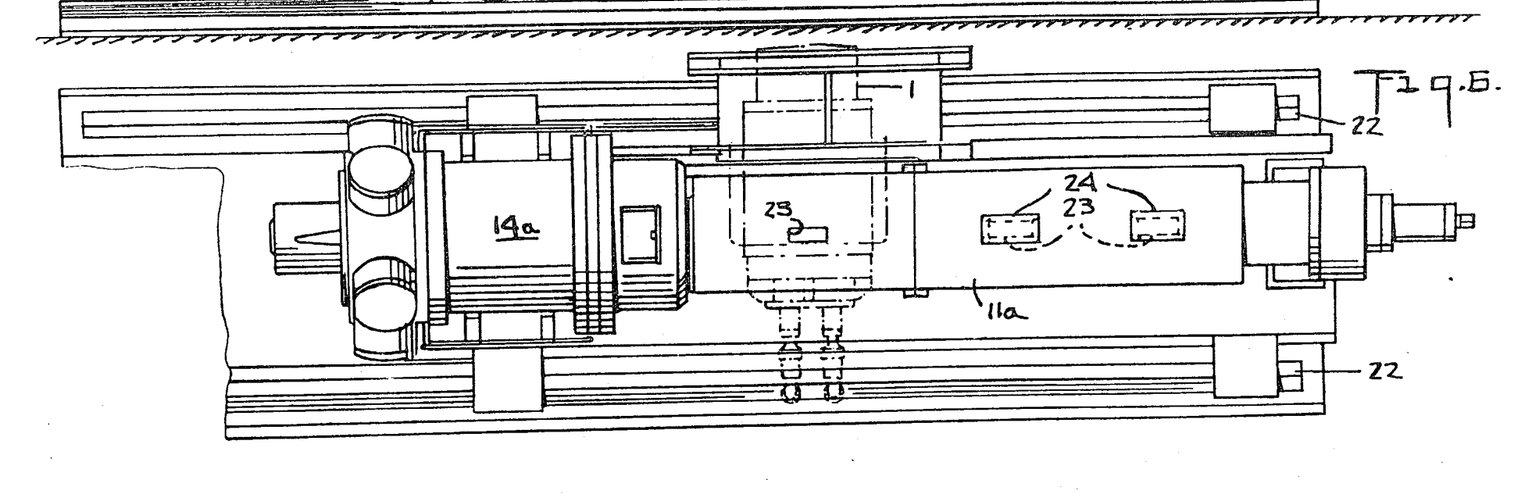
FIG. 6 is a top view of FIG. 5.
Figure 7:
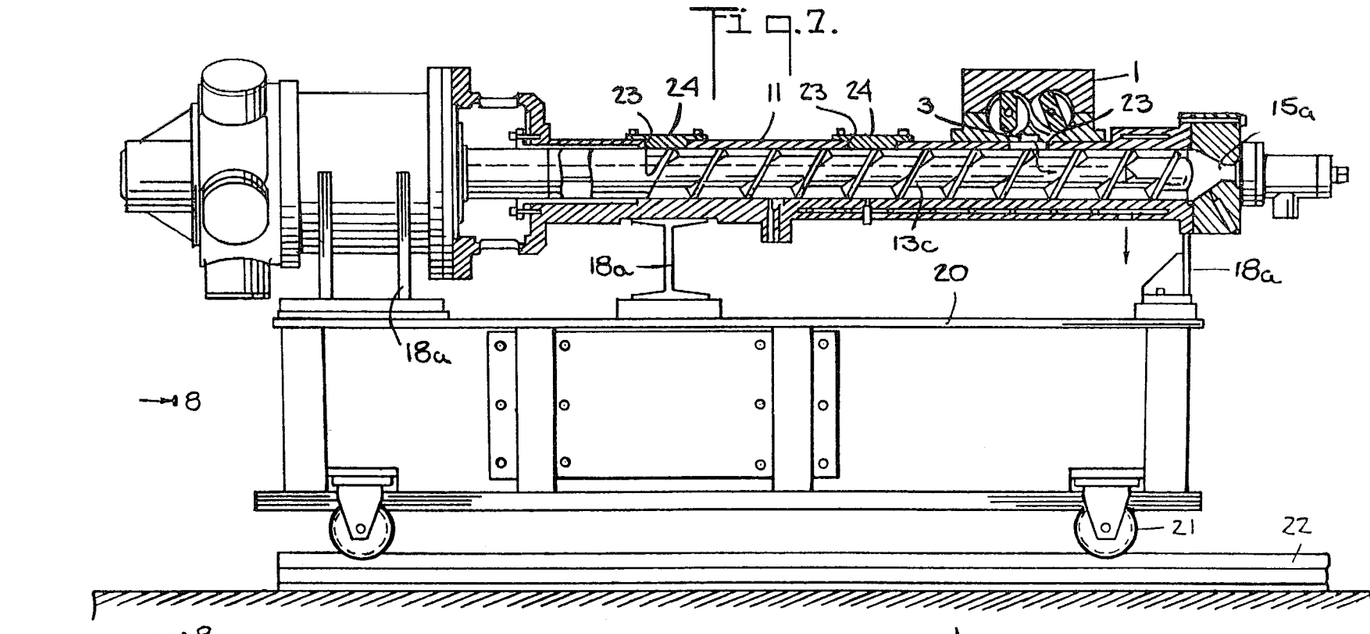
FIG. 7 is the same as FIG. 5, but shows a different mode of operation.
Figure 8:
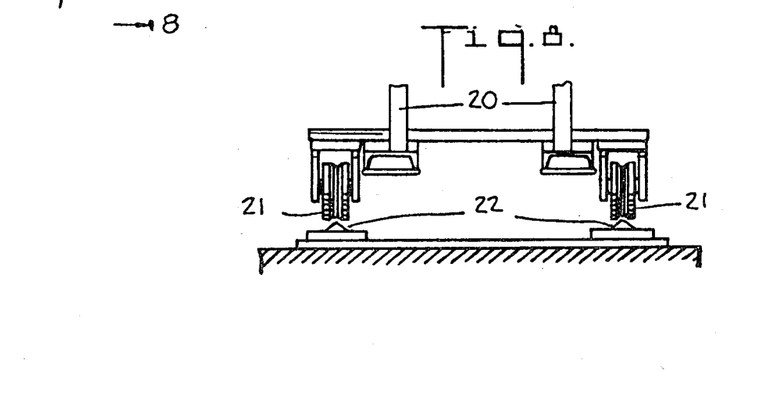
FIG. 8 is a cross section taken on the line 8—8 in FIG. 7.
Figure 9:
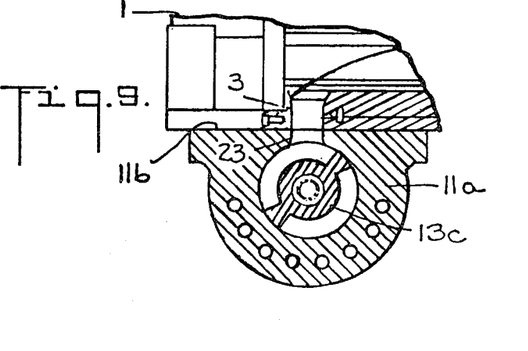
FIG. 9 is a cross section taken on the line 9—9 in FIG. 5.

In FIG. 5 the entire length of the screw-type extruder's barrel 11a is used, whereas when the carriage 20 is moved to the position shown by FIG. 7, only the front end portion of the extruder is used.

The reason for such flexibility is that with some materials mixed and discharged by the continuous mixer, it is undesirable to apply to them what, in effect, may be a further mixing action such as might occur when the carriage 20 is in the FIG. 5 position or at a position between this and the FIG. 7 position. One or another of the closure plates 23 may be removed to degasify the material being screwed through the extruder towards the latter's discharge orifice. If degasification is not desired, the closure plates are applied to all ports not registered with the mixer's discharge orifice.

Figure 10:
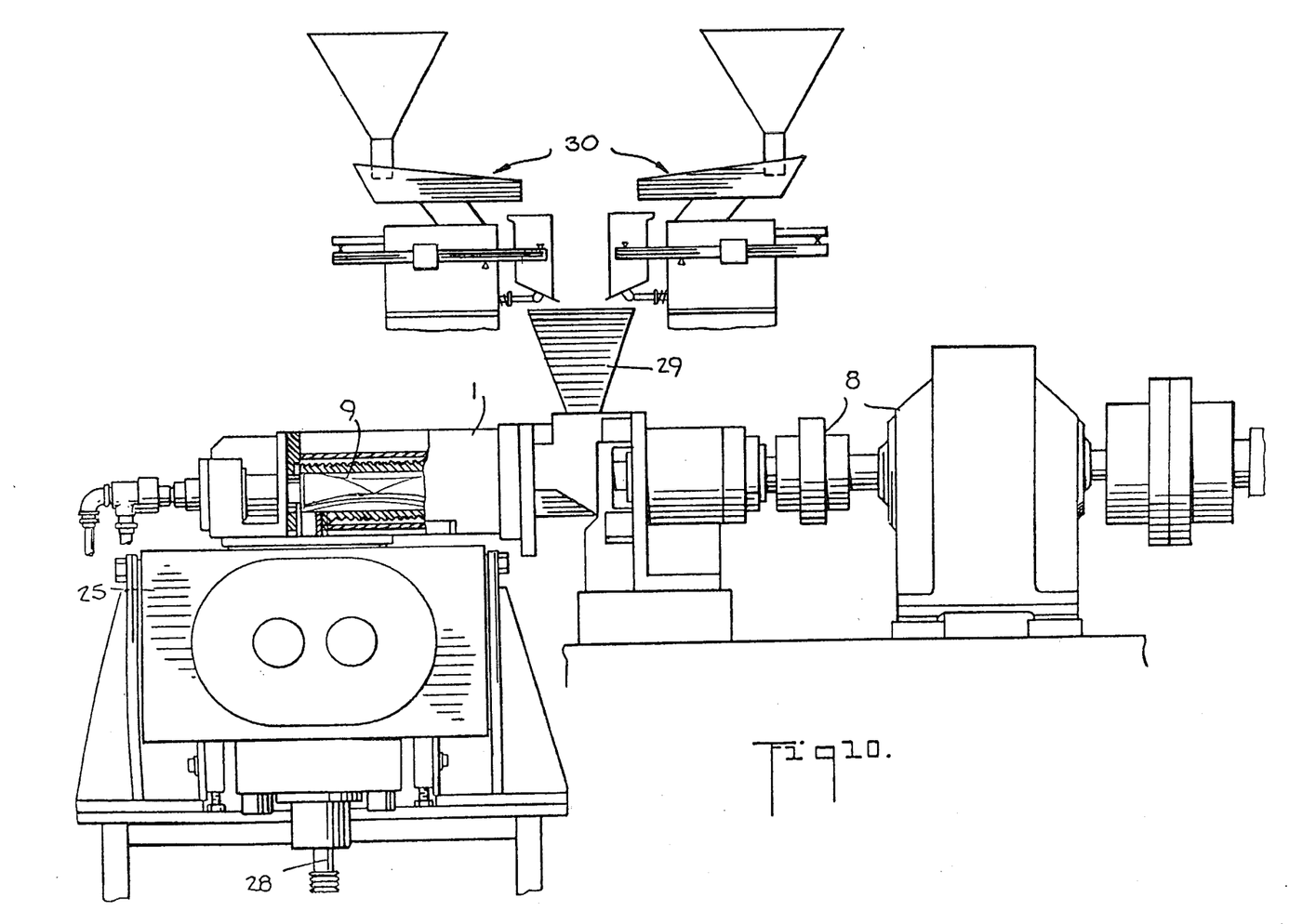
FIG. 10 is a side view of the gear pump form in elevation except for a portion of the continuous mixer and its discharge orifice which are in longitudinal section.
Figure 11:
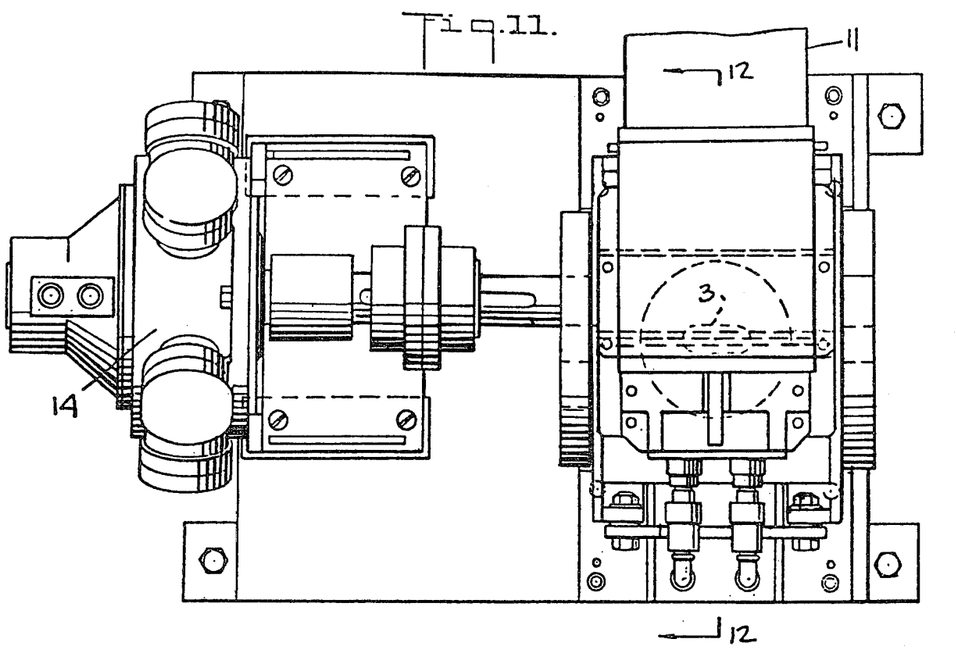
FIG. 11 is a top view of FIG. 5.
Figure 12:
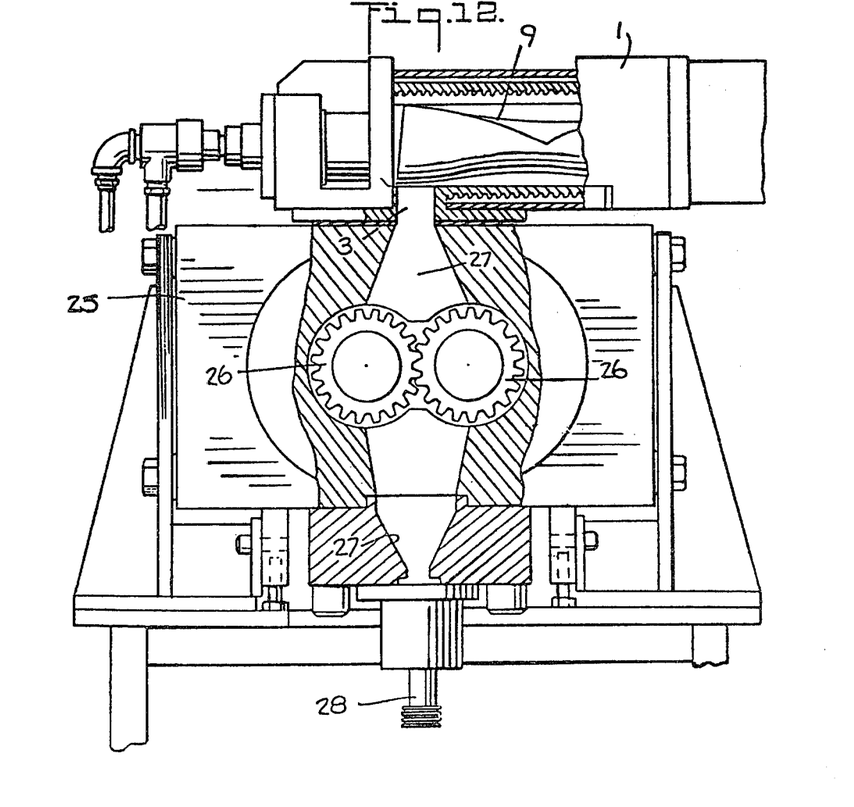
FIG. 12 is a cross section taken on the line 12—12 in FIG. 11.

In FIGS. 10 to 12 the extruder is substituted by a gear pump comprising a housing 25 forming chambers in which the pump gears 26 are located and having an inlet 27 connected to the discharge orifice 3 of the continuous mixer. The gears 26 may be driven by a motor 14 which corresponds to the one already referred to. The pump has its outlet 27 connected to an extrusion orifice 28.

In FIG. 10 the continuous mixer is shown with a hopper 29 connecting with its feeding port 5 and with automatic plastic granule feeders 30 feeding to this hopper. It is in this general fashion that in the commercial operation of the continuous mixer a substantially constant feeding rate to the mixer is effected. This rate may be changed as required, by control of the feeders 30. This arrangement may be used whether or not the discharge restraining means is of the gear pump type as shown in FIG. 10 or the previously described screw-type extruder.

In the operation of the form shown by FIGS. 1 to 4 and 5 to 9, material discharged through the discharge orifice 3 of the continuous mixer is engaged by a moving surface or surfaces in the form of the blade or blades of the screw of the screw-type extruder. If the screw is not rotating, the pressure on the material in the discharge orifice 3 is insufficient to drive the material through the spiral course or courses of the screw's blade or blades. As the material is continuously charged into the mixer, the pressure on the material inside of the mixer increases and, when this has the desired value, the screw should be rotated at a rate just sufficient to match the rate at which the mixer is fed. In the case of the gear pump shown by FIGS. 10 to 12, the gears when unpowered should normally hold back the material discharged from the mixer, because of the friction of the rotating parts. In this instance also, once pressure is built up in the mixer to the desired value, the gears should be rotated to carry the mixed material away from the mixer at the same rate the mixed material is charged into the mixer.

During operation a momentary slowdown of either the screw or the gears serves to increase the mixer's internal pressure, after which the screw or the gears should be returned to the rate matching the mixer's charging rate. A momentary speedup of the screw or gears drops the pressure in the mixer. In all instances the material should be discharged from the mixer at substantially the rate at which the mixer is charged with material to be mixed, regardless of the selected mixer internal pressure.

Automatic control of the screw-type extruder or the gear pump is possible. Thus, FIG. 3 shows a temperature sensing element 31, such as a thermocouple, connected by wiring 32 to a control 33 for the motor 14 as shown in FIG. 1. The control may be as shown by Gagliardi U.S. Pat. No. 3,237,241, but modified to operate the speed controller of the hydraulic motor 14. Correspondingly, the gear pump may be made automatically responsive to the temperature of the material discharged by the mixer.

It is to be noted that with the specific forms of the invention disclosed herein, the surfaces which engage the material discharged from the mixer do so transversely with respect to the flow of this material. They do this so as to engage substantially continuously successive portions of the flow so as to hold back the flow in a substantially positive manner. In the case of the barrel and screw form, these two elements may be made only so long as is required to hold back or restrain the mixer's discharge when extrusion from the barrel under substantially extrusion pressure is not desired.

What is claimed is:

1. An apparatus for continuously processing thermoplastic material under controllable pressure and including a barrel forming at least one substantially cylindrical material working chamber having a material charging orifice adjacent to one end and a material discharge orifice adjacent to the other end, means for substantially continuously feeding material to said chamber through said charging orifice at a controllable rate, a mixing rotor extending axially in said chamber, means for rotating said rotor, said rotor having axially extending blade portions twisting away from the direction of rotation and portions twisting in the direction of rotation, means on said rotor between said charging orifice and said blade portions for substantially continuously pushing material fed to said chamber toward said discharge orifice, a gear type pump having an inlet connected to said discharge orifice for engaging and moving material entering therein through said inlet and means for rotating said gear type pump at a variably controlled rate for applying a variable back pressure to the material fed through said orifice.

2. A continuous mixing for material under controllable pressure and including a barrel forming at least one substantially cylindrical mixing chamber having a discharge orifice at one end, means for substantially continuously feeding material to the other end of said chamber at a controllable rate, a mixing rotor extending axially in said chamber and means for rotating said rotor means on said rotor for substantially continuously pushing said fed material in a direction pushing material already in said chamber through said discharge orifice, and means for controllably applying a variable backpressure to said material pushed through said orifice, said back-pressure applying means being in the form of a body forming a cylindrical control chamber slidably associated with said barrel and provided with a plurality of longitudinally interspaced inlets which may be selectively connected to said discharge orifice and an outlet, said material being pushed through said inlet by material pushed through said orifice, said back-pressure applying means also being a rotative screw extending axially in said control chamber for engaging and moving with said material pushed through said inlet and controlling said back-pressure dependent on the movement of said material engaging and moving means, and means for controlling said movement, said inlets and outlet being interspaced axially and said screw extending from all of said inlets towards said outlet and said inlets having means for closing them when not connected to said discharge orifice, said inlets being connecting directly and positively to said discharge orifice so that said back-pressure controlled by said rotatable screw is reflected through said discharge orifice to material being mixed by said rotor means.

3. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross-section that is substantially like that of a Banbury mixer and having a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means, a barrel forming a cylindrical chamber having a plurality of inlets interspaced along the length therein and an outlet, means for selectively connecting one or another of said inlets directly to said discharge orifice and holding pressure on mixed material discharging under pressure from said orifice and entering said inlets, means for closing any unconnected one of said inlets, a rotative screw in said chamber and extending from said inlets towards said outlet, means for rotating said screws at controllable variable speeds in a direction screwing said discharged materials towards said outlet, the latter being spaced forwardly from said inlets, whereby to control the flow rate of discharging material relative to the rate at which said material is stuffed under pressure into said chambers by said material receiving and stuffing means and therefore the pressure on material in said chambers, said chamber and screw from a zone terminating at a location spaced from said outlet and starting adjacent to said inlets wherein said screw applied backwardly directed force to said discharging material, and thereafter forming a zone wherein said screw applies forwardly directed force to said material.

* * * * *

UNITED STATES PATENT AND TRADEMARK OFFICE
CERTIFICATE OF CORRECTION

PATENT NO. : 4,310,251
DATED : January 12, 1982
INVENTOR(S) : Hans R. Scharer et al.

It is certified that error appears in the above-identified patent and that said Letters Patent are hereby corrected as shown below:

Column 2, line 23, change "2V" to -- 2 --.

Column 5, line 29, change "substantially" to -- substantial --.

Column 5, line 52 (claim 2) change "mixing" to -- mixer -- and before "material" insert -- mixing --.

Column 6, line 49, change "screws" to -- screw --.

Signed and Sealed this

Eleventh Day of May 1982

[SEAL]

Attest:

GERALD J. MOSSINGHOFF

*Attesting Officer*  *Commissioner of Patents and Trademarks*